United States Patent [19]

Nagasaki et al.

[11] Patent Number: 4,985,479
[45] Date of Patent: Jan. 15, 1991

[54] STABILIZED POLYOLEFIN COMPOSITION

[75] Inventors: Hideo Nagasaki; Shinichi Yachigo, both of Osaka; Takeshi Takata; Hiroki Yamamoto, both of Hyogo; Yukoh Takahashi, Osaka, all of Japan

[73] Assignee: Sumitomo Chemical Company, Ltd., Osaka, Japan

[21] Appl. No.: 329,764

[22] Filed: Mar. 28, 1989

Related U.S. Application Data

[63] Continuation-in-part of Ser. No. 124,763, Nov. 23, 1987, abandoned.

[30] Foreign Application Priority Data

Nov. 27, 1986 [JP] Japan .................................. 61-283232
Sep. 14, 1987 [JP] Japan .................................. 62-230401

[51] Int. Cl.$^5$ .......................... C08K 5/34; C08K 5/53; C08K 5/09
[52] U.S. Cl. .................................... 524/96; 524/103; 524/126; 524/128; 524/153; 524/291
[58] Field of Search ................ 524/96, 103, 126, 128, 524/153, 291

[56] References Cited

U.S. PATENT DOCUMENTS

| | | | |
|---|---|---|---|
| 3,112,338 | 11/1963 | Smutny ................................ | 524/291 |
| 4,025,486 | 5/1977 | Gilles ................................... | 524/101 |
| 4,035,323 | 7/1977 | Mathis ................................. | 524/102 |
| 4,086,204 | 4/1978 | Cassandrini et al. ............... | 544/182 |
| 4,206,111 | 6/1980 | Valdiserri et al. .................. | 524/291 |
| 4,331,586 | 5/1982 | Hardy ................................. | 525/186 |
| 4,467,061 | 8/1984 | Yamamoto et al. ................ | 524/87 |
| 4,692,486 | 9/1987 | Gugumus ........................... | 524/102 |

FOREIGN PATENT DOCUMENTS

| | | |
|---|---|---|
| 58-79033 | 5/1983 | Japan . |
| 59-219353 | 12/1984 | Japan . |
| 60-120732 | 6/1985 | Japan . |
| 60-130635 | 7/1985 | Japan . |
| 60-199039 | 10/1985 | Japan . |

Primary Examiner—Kriellion Morgan
Attorney, Agent, or Firm—Cushman, Darby & Cushman

[57] ABSTRACT

A stabilized polyolefin composition having improved weathering resistance is provided, whereby the following four components are incorporated into a polyolefin:
(A) a hindered piperidine compound having a molecular weight of more than 750, such as poly-{[6-morpholino-1,3,5-triazine-2,4-diyl][2,2,6,6-tetramethyl-4-piperidyl)imino]hexamethylene[2,2,6,6-tetramethyl-4-piperidyl)imino]},
(B) a hindered piperidine compound having a molecular weight of less than 500, such as bis(2,2,6,6-tetramethyl-4-piperidyl) sebacate,
(C) a benzoate compound such as 2,4-di-t-butylphenyl 3,5-di-t-butyl-4-hydroxybenzoate, and
(D) a phosphorus-containing compound such as bis(2,4-di-t-butylphenyl) pentaerythritol diphosphite.

14 Claims, No Drawings

STABILIZED POLYOLEFIN COMPOSITION

This is a continuation-in-part application of Ser. No. 07/124,763 filed on Nov. 23, 1987.

BACKGROUND OF THE INVENTION

The present invention relates to a polyolefin composition which is stabilized, especially improved in weathering resistance.

Polyolefins are excellent in their mechanical properties and extremely useful as molding products, films, fibers and the like, but they have a drawback of being easily degraded with light.

Therefore, it has been known to blend compounds such as benzophenones, benzotriazoles, nickel chelates and hindered amines, alone or in combination as weathering stabilizers (for instance, U.S. Pat. Nos. 4,467,061, 4,331,586 and 4,086,204 and Japanese Patent Laid-Open Nos. 219353/1984 and 79033/1983).

However, such polyolefin compositions are not satisfactory yet in weathering resistance. Besides, recently, other polymers, inorganic fillers, pigments and the like have often been added to polyolefins for improving mechanical properties or performance and appearance of molding products. Especially, when inorganic fillers are added, weathering resistance is apt to decrease.

SUMMARY OF THE INVENTION

As a result of the inventors' intensive researches in an attempt to develop polyolefin compositions which have excellent weathering resistance regardless of whether they contain inorganic fillers or not, it has been found that polyolefin compositions of excellent weathering resistance are obtained by specifying combination of weathering stabilizers added and furthermore adding a specific phosphorus-containing compound.

The present invention provides a polyolefin composition comprising a polyolefin and, per 100 parts by weight of the polyolefin, (A) 0.01 to 1 part by weight of a hindered piperidine compound having a molecular weight of more than 750, said hindered piperidine compound being selected from the group consisting of a compound having a repeating unit of

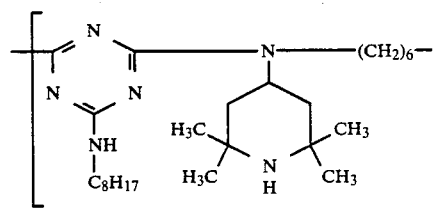

(A-1)

wherein n is an integer of 2 to 20, a compound having a repeating unit of

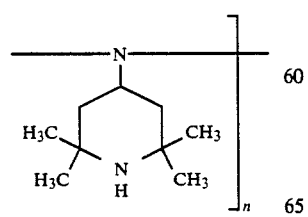

wherein n is an integer of 2 to 20, a compound having a repeating unit of

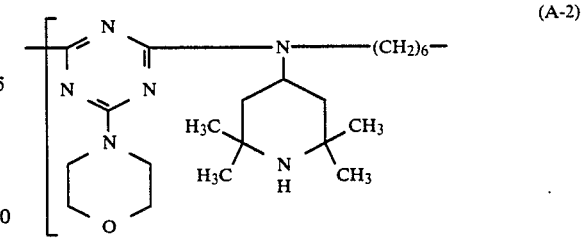

(A-2)

wherein n is an integer of 2 to 20, and a compound of

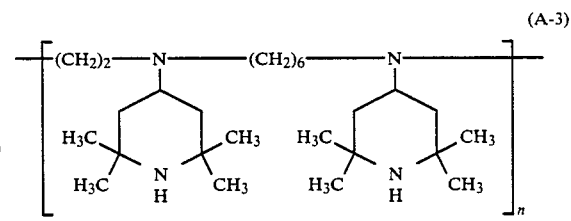

(A-3)

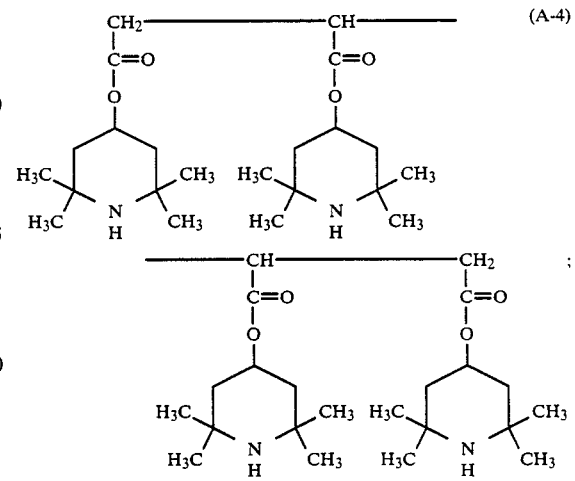

(A-4)

(B) 0.01 to 1 part by weight of a hindered piperidine compound having a molecular weight of less than 500, said hindered piperidine compound being selected from the group consisting of

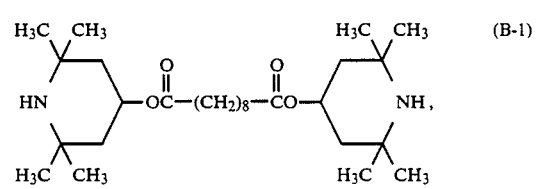

(B-1)

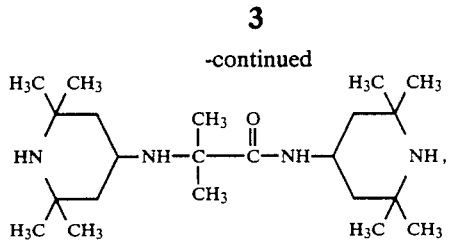

(B-2)

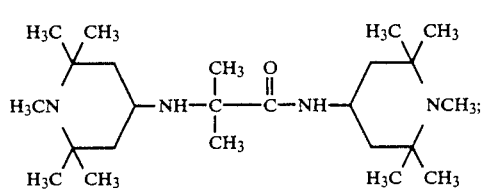

(B-3)

and

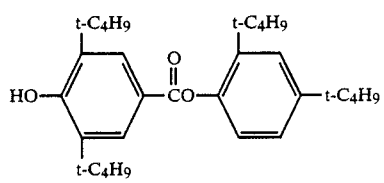

(B-4)

(C) 0.01 to 1 part by weight of a benzoate compound selected from the group consisting of

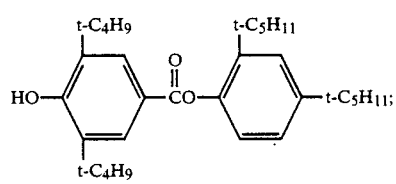

(C-1)

and

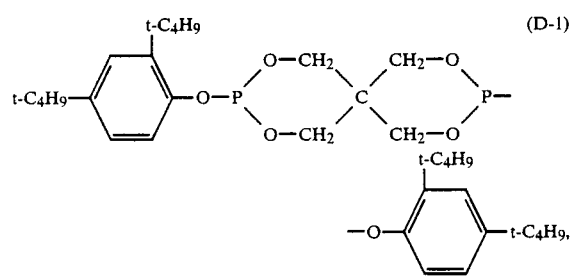

(C-2)

and (D) 0.01 to 1 part by weight of a phosphorus-containing compound selected from the group consisting of

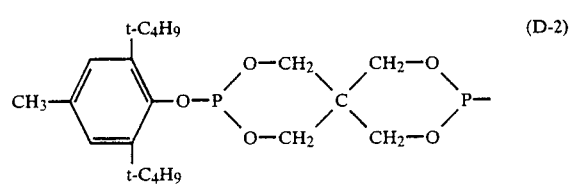

(D-1)

(D-2)

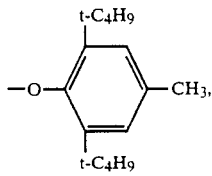

(D-3)

(D-4)

and (D-5)

DETAILED DESCRIPTION OF THE INVENTION

The polyolefin in the present invention means a polymer whose main polymerizing component is α-olefin such as ethylene, propylene, butene-1, hexene-1, 4-methylpentene-1 and the like. It includes a polymer of α-olefin and a random or block copolymer of two or more α-olefins. Typical examples of the polyolefin are polyethylene, polypropylene, polybutene-1, polyisobutene, poly-3-methylbutene-1, poly-4-methylpentene-1, ethylene propylene copolymer, ethylene butene-1 copolymer, propylene 4-methylpentene-1 copolymer, propylene butene-1 copolymer, decene-1 4-m-methylpentene-1 copolymer, ethylene propylene butene-1 copolymer and the like.

The polyolefin further includes a copolymer of one or more α-olefin and other unsaturated monomer. Examples of such unsaturated monomer are conjugated dienes, non-conjugated dienes, acrylic acid, methacrylic acid, vinyl acetate and the like. The copolymer of α-olefin and other unsaturated monomer may be modified, for example, grafted by α or β-unsaturated fatty acid, alicyclic acid or their derivatives. It includes rubber-like, fatty or waxy polymers.

Furthermore, in the present invention, a mixture obtained by adding synthetic rubber or an inorganic filler to these polyolefins may also be used depending on the application uses.

Preferred synthetic rubber usable in the present invention is ethylene α-olefin copolymer rubber, e.g., copolymer rubbers of ethylene and α-olefin. Examples of such synthetic rubber are ethylene propylene copolymer, ethylene butene-1 copolymer, ethylene hexene-1 copolymer and the like. Another example of such synthetic rubber is ternary copolymer rubber in which ethylene, propylene and non-conjugated diene are copolymerized (hereinafter refered as EPDM). Examples of such non-conjugated diene as the third ingredient are ethylydene norbornene, cyclopentadiene, and the like. Among the above examples of synthetic rubber, ethylene propylene copolymer rubber and EPDM are most preferred.

Inorganic fillers usable in the present invention include, for example, talc, mica, wollastonite, calcium carbonate, barium sulfate, magnesium carbonate, clay, alumina, silica, calcium sulfate, carbon fibers, glass fibers, metal fibers, silica sand, silicic rock, carbon block, titanium oxide, magnesium hydroxide, asbestos, zeolite, molybdenum, diatomaceous earth, sericite, white sand microballoon, calcium hydroxide, calcium sulfite, sodium sulfate, bentonite and graphite. Among them, talc, mica, calcium carbonate, glass fibers, wollastonite and the like are preferred for improving impact strength at low temperature, moldability and paintability.

Particularly, in order to obtain a polyolefin composition having improved impact strength at low temperature, moldability and paintability, it is preferred to mix from 25 to 90% by weight of crystalline polyolefin, from 5 to 35% by weight of ethylene α-olefin copolymer rubber and from 5 to 40% by weight of an inorganic filler.

The stabilizers used in the present invention are the compounds represented by the above groups (A) to (D). (A-1) and (A-2) are preferred as the hindered piperidine compound (A) having a molecular weight of more than 750, (B-1) and (B-2) are preferred as the hindered piperidine compound (B) having a molecular weight of less than 500, (C-1) is preferred as the benzoate compound (C) and (D-1), (D-2) and (D-3) are preferred as the phosphorus-containing compound (D).

The stabilizers (A-1), (A-2) and (A-3) are represented by the repeating unit, and their end groups are not specified. Examples of such end groups are hydrogen, halogen and other monofunctional groups. Especially, the following compounds are preferably used in the present invention:

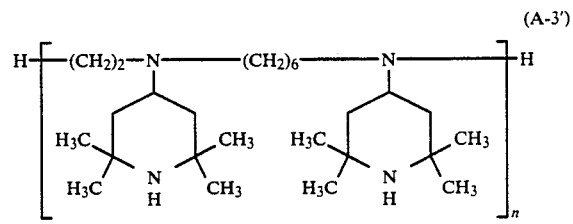

wherein n is an integer of 2 to 20, as the (A - 3).

In the present invention, the stabilizers of the groups (A), (B), (C) and (D) are all essential components and the desired effects are not obtained if any one of them is omitted. The stabilizers of the each group (A) to (D) may be used in combination of 2 or more, respectively.

Amounts of each stabilizer in the groups (A) to (D) to be added are from 0.01 to 1 part by weight, preferably, from 0.05 to 0.5 part by weight, respectively based on 100 parts by weight of the polyolefin.

Furthermore, in order to improve the outer looking or appearance of molded products, various pigments may be added for coloration to the composition. Any organic and inorganic pigments suitable for polyolefins may be used to this effect. For instance, mention may be made; titanium oxide, carbon black, yellow iron oxide, titanium yellow, Hansa yellow, benzine yellow, red iron oxide, Permanent red, thioindigo red, thioindigo maroon, manganese purple, dioxazine violet, ultramarine, phthalocyanine blue, phthalocyanine green, isoindolenone yellow, quinophthalone yellow, condensated azo yellow, perinone orange, quinacridone red, quinacridone scarlet, perylene scarlet condensated azo red, indanthrone blue and cinquasia red. As the dispersant for the pigment, metal soaps such as calcium stearate and magnesium stearate, polyolefin waxes such as polyethylene wax, polypropylene wax and the like may be used. The polyolefin wax is preferably premixed with the pigment in a powder ball mill in order to improve the dispersing effect thereof.

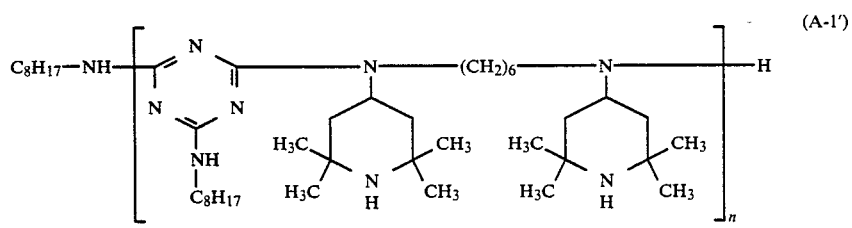

where n is an integer of 2 to 20, as the (A - 1);

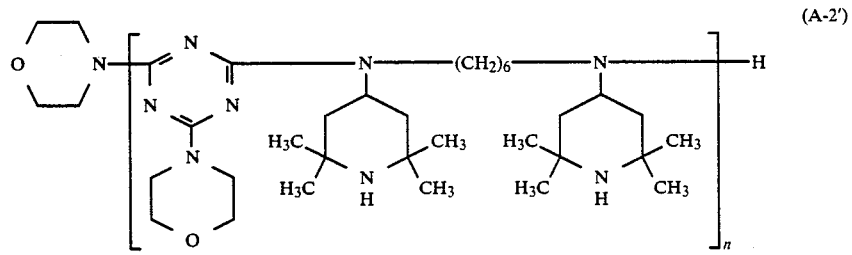

wherein n is an integer of 2 to 20, as the (A - 2); and

The calcium stearate is effective as a stabilizer even if the composition contains no pigment and may be added preferably in an amount of 1 part by weight or less per 100 parts by weight of the polyolefin in addition to said stabilizers essential for the present composition.

Furthermore, in the present invention, anti-oxidants ordinarily used for polyolefins such as phenolic compounds and thioether compounds may be used in addition to the stabilizers specified in the present invention.

As the phenolic antioxidants, mention may be made of, for example, 2,6-di-t-butyl-4-methylphenol, n-octadecyl-3-(3',5'-di-t-butyl-4'-hydroxyphenyl)propionate, tetrakis[methylene-3-(3',5'-di-t-butyl-4'-hydroxyphenyl)propionate]methane, 1,3,5-tris(4-t-butyl-3-hydroxy-2,6-dimethylbenzyl)isocyanurate, 3,9-bis[2-{3-(3-t-butyl-4-hydroxy-5-methylphenyl)propionyloxy}-1,1-dimethylethyl]-2,4,8,10-tetraoxaspiro[5,5]undecane, tris(3,5-di-t-butyl-4-hydroxybenzyl)isocyanurate and the like.

As the thioether antioxidants, mention may be made of, for example, dilauryl-3,3'-thiodipropionate, ditridecyl-3,3'-thiodipropionate, dimyristyl-3,3'-thiodipropionate, distearyl-3,3'-thiodipropionate, pentaerythritol-tetrakis(β-lauryl-thiopropionate), 3,9-bis(-dodecylthioethyl)-2,4,8,10-tetraoxaspiro[5,5]undecane and the like.

However, the thioether antioxidants tend to damage weathering resistance and it is desirable not to use them. Even if used, they must be in an amount of ⅓ or less of the total addition amount of compounds in the groups (A) and (B).

The composition of the present invention may contain other additives, for example, process oils, plasticizers, lubricating oils, lubricants, nucleating agents, antistatic agents, releasing agents and anti-mould agents, so long as they do not make any hard to the property thereof.

The various stabilizers and additives mentioned above are easily incorporated into the polyolefin by kneading them in a heat-molten state using ordinary kneaders such as single-screw extruder, twin-screw extruder, Bumbury mixer, rolls, Brabender and the similar kneaders.

The polyolefin composition of the present invention has markedly superior weathering resistance which has never been found in the conventional products and is very high in industrial value.

The present invention will be illustrated by the following examples.

EXAMPLES 1-21 AND COMPARATIVE EXAMPLES 1-9

To 100 parts by weight of powdery propylene ethylene copolymer (ethylene content of 8.0% by weight and melt index of 2.8 g/10 min) were added 0.05 part by weight of calcium stearate and additives as shown in Table 1 in the amounts of part by weight as shown in Table 1 and these were mixed by Henschel mixer. The mixture was extruded at 230° C. by a 30 mm extruder to pelletize it.

The pellets were then shaped into a sheet of 60 mm ×60 mm with 1 mm thickness at 240° C. by a 5.5 oz injection molding machine. The sheet thus obtained was used as a test piece for weathering test.

The weathering test was carried out in Sunshine Weather-ometer (black panel having a temperature of 83° C. and water spray time of 18 min/120 min). Evaluation of weathering resistance was effected by measuring the time required for occurrence of cracks on the surface of the test piece. The results are shown in Table 1.

The marks A-1', A-2', A-3', A-4, B-1, B-2, B-3, B-4, C-1, C-2, D-1, D-2, D-3, D-4 and D-5 for the additives in Table 1 indicate the compounds mentioned hereinbefore as the additives used in the present invention. The repeating unit n in the compounds A-1', A-2' and A-3' were 2 to 10.

Other marks indicate the following compounds:

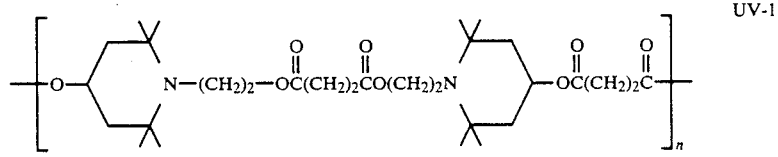

UV-1 wherein n is 2 to 20: Tinuvin 622 LD sold by Ciba-Geigy Corp.

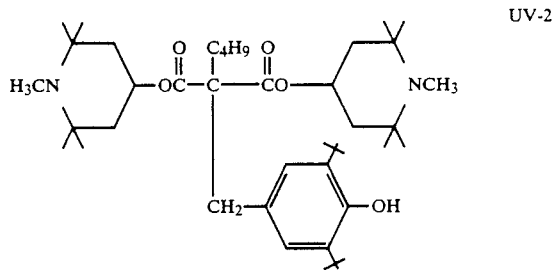

UV-2

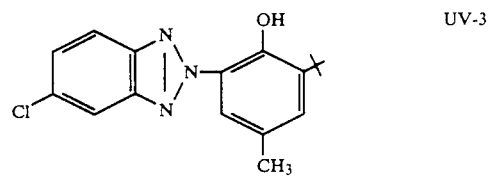

UV-3

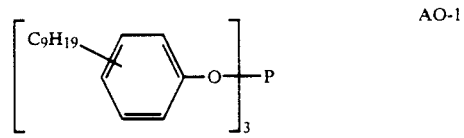

AO-1

AO-2: Tetrakis[methylene-3-(3',5'-di-t-butyl-4'-hydroxyphenyl)propionate]methane.

AO-3: Tris(3,5-di-t-butyl-4-hydroxybenzyl)isocyanurate.

AO-4: 1,3,5-tris(4-t-butyl-3-hydroxy-2,6-dimethylbenzyl)isocyanurate.

AO-5: 3,9-bis[2-{3-(3-t-butyl-4-hydroxy-5-methylphenyl)propionyloxy}-1,1-dimethylethyl]-2,4,8,10-tetraoxaspiro[5,5]undecane.

AO-6: Pentaerythritol-tetrakis(β-laury-thiopropionate).

AO-7: Dimyristyl-3,3'-thiodipropionate.

AO-8: Distearyl-3,3'-thiodipropionate.

TABLE 1

| No. | (A) | | (B) | | (C) | | (D) | | Phenolic compound | | Thioether compound | | Time for occurrence of cracks hrs |
|---|---|---|---|---|---|---|---|---|---|---|---|---|---|
| Examples | | | | | | | | | | | | | |
| 1 | A-1' | 0.1 | B-1 | 0.1 | C-1 | 0.1 | D-1 | 0.1 | | | | | 2800 |
| 2 | A-2' | 0.1 | B-1 | 0.1 | C-1 | 0.1 | D-1 | 0.1 | | | | | 2900 |
| 3 | A-1' | 0.1 | B-2 | 0.1 | C-1 | 0.1 | D-1 | 0.1 | | | | | 2900 |
| 4 | A-2' | 0.1 | B-2 | 0.1 | C-1 | 0.1 | D-1 | 0.1 | | | | | 2950 |
| 5 | A-1' | 0.1 | B-1 | 0.1 | C-1 | 0.1 | D-2 | 0.1 | | | | | 2800 |
| 6 | A-1' | 0.1 | B-1 | 0.1 | C-1 | 0.1 | D-3 | 0.1 | | | | | 2900 |
| 7 | A-2' | 0.1 | B-2 | 0.1 | C-1 | 0.1 | D-3 | 0.1 | | | | | 2900 |
| 8 | A-3' | 0.1 | B-1 | 0.1 | C-1 | 0.1 | D-1 | 0.1 | | | | | 2700 |
| 9 | A-4 | 0.1 | B-1 | 0.1 | C-1 | 0.1 | D-1 | 0.1 | | | | | 2650 |
| 10 | A-1' | 0.1 | B-3 | 0.1 | C-1 | 0.1 | D-1 | 0.1 | | | | | 2600 |
| 11 | A-1' | 0.1 | B-1 | 0.1 | C-2 | 0.1 | D-4 | 0.1 | | | | | 2500 |
| 12 | A-1' | 0.1 | B-1 | 0.1 | C-1 | 0.1 | D-5 | 0.1 | | | | | 2500 |
| 13 | A-1' | 0.5 | B-1 | 0.1 | C-1 | 0.1 | D-1 | 0.1 | | | | | 3600 |
| 14 | A-2' | 0.1 | B-1 | 0.5 | C-1 | 0.1 | D-1 | 0.1 | | | | | 3500 |
| 15 | A-2' | 0.1 | B-2 | 0.1 | C-1 | 0.5 | D-1 | 0.1 | | | | | 3300 |
| 16 | A-1' | 0.05 | B-1 | 0.05 | C-1 | 0.05 | D-1 | 0.05 | AO-2 | 0.2 | | | 2300 |
| 17 | A-2' | 0.2 | B-1 | 0.2 | C-1 | 0.2 | D-1 | 0.05 | AO-3 | 0.1 | | | 3650 |
| 18 | A-2' | 0.3 | B-2 | 0.3 | C-1 | 0.1 | D-2 | 0.05 | AO-4 | 0.05 | AO-6 | 0.05 | 3650 |
| 19 | A-1' | 0.2 | B-1 | 0.1 | C-1 | 0.2 | D-1 | 0.05 | AO-5 | 0.1 | AO-7 | 0.05 | 3600 |
| 20 | A-1' | 0.1 | B-4 | 0.1 | C-1 | 0.1 | D-1 | 0.1 | | | | | 2800 |
| 21 | A-2' | 0.1 | B-4 | 0.1 | C-1 | 0.1 | D-1 | 0.1 | | | | | 2900 |
| Comparative examples | | | | | | | | | | | | | |
| 1 | UV-1 | 0.1 | B-1 | 0.1 | C-1 | 0.1 | D-1 | 0.1 | | | | | 2100 |
| 2 | A-1' | 0.1 | UV-2 | 0.1 | C-1 | 0.1 | D-1 | 0.1 | | | | | 2000 |
| 3 | A-1' | 0.1 | B-1 | 0.1 | C-1 | 0.1 | AO-1 | 0.1 | | | | | 2000 |
| 4 | A-1' | 0.1 | B-1 | 0.1 | C-1 | 0.1 | — | | | | | | 1900 |
| 5 | A-1' | 0.1 | B-1 | 0.1 | — | | D-1 | 0.1 | | | | | 1800 |
| 6 | A-1' | 0.1 | — | | C-1 | 0.1 | D-1 | 0.1 | | | | | 1600 |
| 7 | — | | B-1 | 0.1 | C-1 | 0.1 | D-1 | 0.1 | | | | | 1600 |
| 8 | A-1' | 0.1 | B-1 | 0.1 | — | | D-5 | 0.1 | AO-2 | 0.1 | | | 1800 |
| 9 | — | | B-1 | 0.1 | UV-3 | 0.1 | D-1 | 0.1 | AO-2 | 0.1 | AO-8 | 0.05 | 1900 |

EXAMPLES 22-41 AND COMPARATIVE EXAMPLES 10-18

To 100 parts by weight of powdery propylene ethylene copolymer (ethylene content of 4% by weight and melt index of 6.0 g/10 min) were added 20 parts by weight of talc as a filler having an average particle size of 1.5μ, 0.5 part by weight of carbon black as a pigment, 0.05 part by weight of calcium stearate and additives as shown in Table 2 in the amounts of part by weight as shown in Table 2. Test pieces were prepared therefrom by extrusion and injection molding in the same manner as in the Examples 1–21, and were subjected to weathering test in the same manner as in the Examples 1–21. The results are shown in Table 2. The marks of the additives are the same as in Table 1.

TABLE 2

| No. | (A) | | (B) | | (C) | | (D) | | Phenolic compound | | Thioether compound | | Time for occurrence of cracks hrs |
|---|---|---|---|---|---|---|---|---|---|---|---|---|---|
| Examples | | | | | | | | | | | | | |
| 22 | A-1' | 0.15 | B-1 | 0.15 | C-1 | 0.15 | D-1 | 0.1 | | | | | 3200 |
| 23 | A-2' | 0.15 | B-1 | 0.15 | C-1 | 0.15 | D-1 | 0.1 | | | | | 3400 |
| 24 | A-1' | 0.15 | B-2 | 0.15 | C-1 | 0.15 | D-1 | 0.1 | | | | | 3200 |
| 25 | A-2' | 0.15 | B-2 | 0.15 | C-1 | 0.15 | D-1 | 0.1 | | | | | 3450 |
| 26 | A-1' | 0.15 | B-1 | 0.15 | C-1 | 0.15 | D-2 | 0.1 | | | | | 3200 |
| 27 | A-1' | 0.15 | B-1 | 0.15 | C-1 | 0.15 | D-3 | 0.1 | | | | | 3200 |
| 28 | A-2' | 0.15 | B-2 | 0.15 | C-1 | 0.15 | D-3 | 0.1 | | | | | 3400 |
| 29 | A-3' | 0.15 | B-1 | 0.15 | C-1 | 0.15 | D-1 | 0.1 | | | | | 3200 |
| 30 | A-4 | 0.15 | B-1 | 0.15 | C-1 | 0.15 | D-1 | 0.1 | | | | | 3200 |
| 31 | A-1' | 0.15 | B-3 | 0.15 | C-1 | 0.15 | D-1 | 0.1 | | | | | 3250 |
| 32 | A-2' | 0.15 | B-4 | 0.15 | C-1 | 0.15 | D-1 | 0.1 | | | | | 3400 |
| 33 | A-1' | 0.15 | B-1 | 0.15 | C-2 | 0.15 | D-4 | 0.1 | | | | | 3200 |
| 34 | A-1' | 0.15 | B-1 | 0.15 | C-1 | 0.15 | D-5 | 0.1 | | | | | 3200 |
| 35 | A-1' | 0.4 | B-1 | 0.2 | C-1 | 0.1 | D-1 | 0.1 | | | | | 4200 |
| 36 | A-2' | 0.1 | B-1 | 0.5 | C-1 | 0.1 | D-1 | 0.1 | | | | | 4500 |
| 37 | A-2' | 0.1 | B-2 | 0.1 | C-1 | 0.5 | D-1 | 0.1 | | | | | 4300 |
| 38 | A-1' | 0.1 | B-1 | 0.1 | C-1 | 0.1 | D-1 | 0.05 | AO-2 | 0.2 | | | 2800 |
| 39 | A-2' | 0.2 | B-1 | 0.2 | C-1 | 0.2 | D-1 | 0.05 | AO-3 | 0.1 | | | 3500 |
| 40 | A-2' | 0.3 | B-2 | 0.3 | C-1 | 0.1 | D-2 | 0.05 | AO-4 | 0.05 | AO-6 | 0.05 | 3500 |
| 41 | A-1' | 0.2 | B-1 | 0.1 | C-1 | 0.2 | D-1 | 0.05 | AO-5 | 0.1 | AO-7 | 0.05 | 3350 |
| Comparative examples | | | | | | | | | | | | | |
| 10 | UV-1 | 0.15 | B-1 | 0.15 | C-1 | 0.15 | D-1 | 0.1 | | | | | 2400 |
| 11 | A-1' | 0.15 | UV-2 | 0.15 | C-1 | 0.15 | D-1 | 0.1 | | | | | 2450 |

TABLE 2-continued

| No. | (A) | | (B) | | (C) | | (D) | | Phenolic compound | | Thioether compound | | Time for occurrence of cracks hrs |
|---|---|---|---|---|---|---|---|---|---|---|---|---|---|
| 12 | A-1' | 0.15 | B-1 | 0.15 | C-1 | 0.15 | AO-1 | 0.1 | | | | | 2400 |
| 13 | A-1' | 0.15 | B-1 | 0.15 | C-1 | 0.15 | — | | | | | | 2200 |
| 14 | A-1' | 0.15 | B-1 | 0.15 | — | | D-1 | 0.1 | | | | | 2000 |
| 15 | A-1' | 0.15 | — | | C-1 | 0.15 | D-1 | 0.1 | | | | | 1900 |
| 16 | — | | B-1 | 0.15 | C-1 | 0.15 | D-1 | 0.1 | | | | | 1900 |
| 17 | A-1' | 0.15 | B-1 | 0.15 | — | | D-5 | 0.1 | AO-2 | 0.1 | | | 1900 |
| 18 | — | | B-1 | 0.15 | UV-3 | 0.15 | D-1 | 0.1 | AO-2 | 0.1 | AO-8 | 0.05 | 2100 |

We claim:
1. A polyolefin composition comprising a polyolefin and, per 100 parts by weight of the polyolefin,
(A) 0.01 to 1 part by weight of a hindered piperidine compound having a molecular weight of more than 750, said hindered piperidine compound being selected from the group consisting of a compound having a repeating unit of

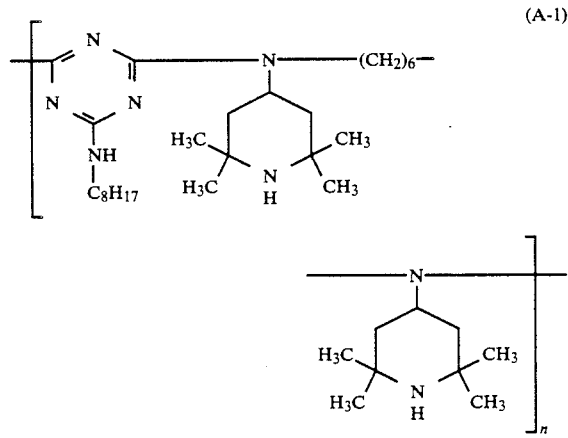

(A-1)

wherein n is an integer of 2 to 20, a compound having a repeating unit of

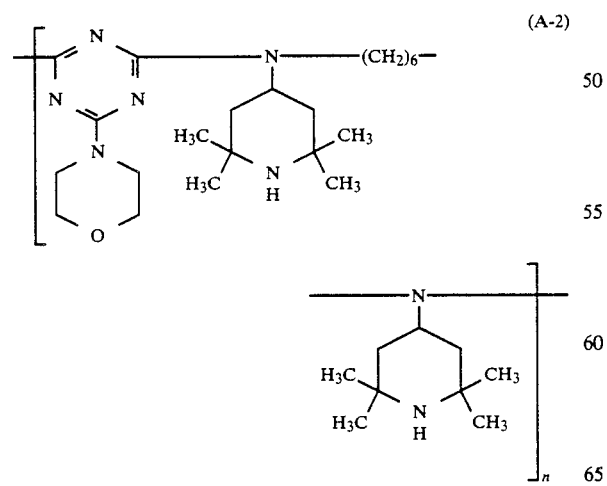

(A-2)

wherein n is an integer of 2 to 20, a compound having a repeating unit of

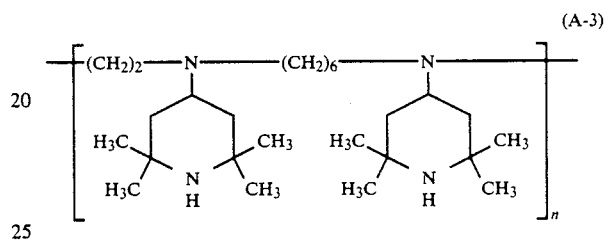

(A-3)

wherein n is an integer of 2 to 20, and a compound of

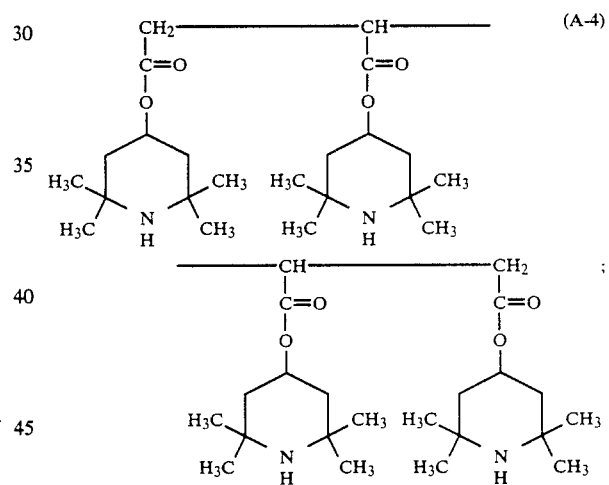

(A-4)

(B) 0.01 to 1 part by weight of a hindered piperidine compound having a molecular weight of less than 500, said hindered piperidine compound being selected from the group consisting of

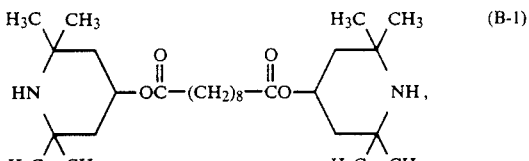

(B-1)

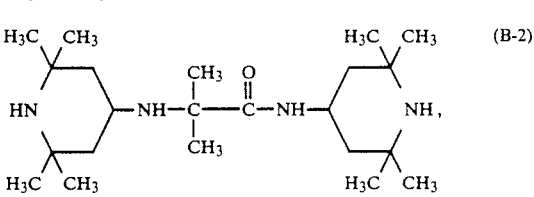

(B-2)

-continued

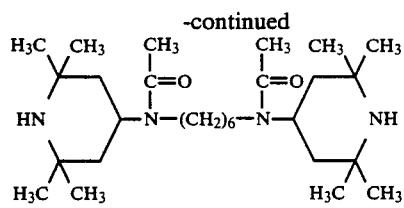
(B-3)

and

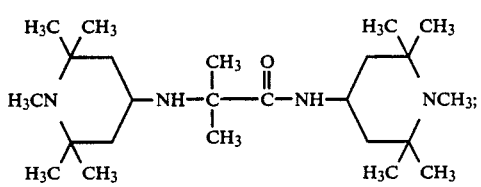
(B-4)

(C) 0.01 to 1 part by weight of a benzoate compound selected from the group consisting of

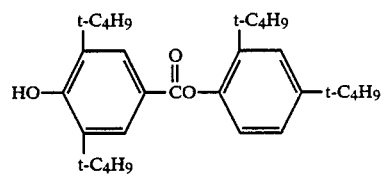
(C-1)

and

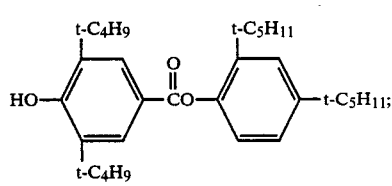
(C-2)

and (D) 0.01 to 1 part by weight of a phosphorus-containing compound selected from the group consisting of

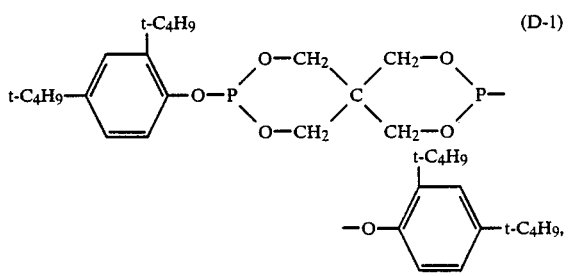
(D-1)

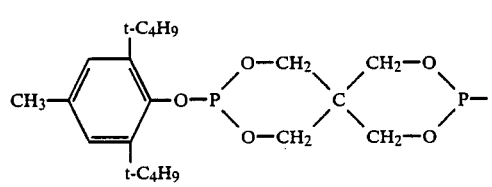
(D-2)

-continued

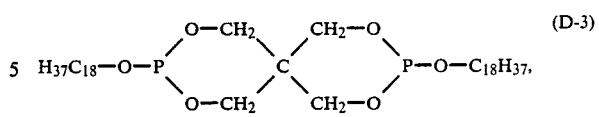
(D-3)

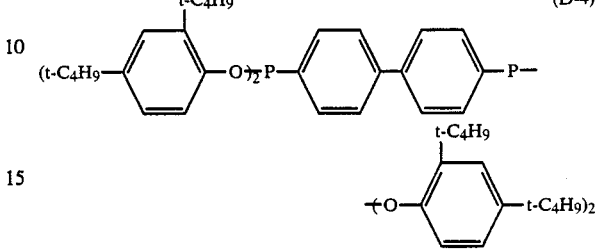
(D-4)

and

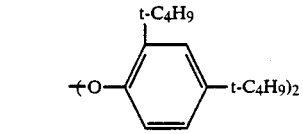
(D-5)

2. The polyolefin composition according to claim 1, wherein said hindered piperidine compound of the group (A) is selected from the group consisting of (A-1) and (A-2).

3. The polyolefin composition according to claim 1, wherein said hindered piperidine compound of the group (B) is selected from the group consisting of (B-1) and (B-2).

4. The polyolefin composition according to claim 1, wherein said benzoate compound of the group (C) is (C-1).

5. The polyolefin composition according to claim 1, wherein said phosphorus-containing compound of the group (D) is selected from the group consisting of (D-1), (D-2) and (D-3).

6. The polyolefin composition according to claim 1, which further contains pigment.

7. The polyolefin composition according to claim 1, which further contains calcium stearate.

8. The polyolefin composition according to claim 1, which further contains a phenolic compound and/or a thioether compound as an antioxidant.

9. A method for stabilizing a polyolefin which comprises incorporating into the polyolefin, per 100 parts by weight of the polyolefin, (A) 0.01 to 1 part by weight of a hindered piperdine compound having a molecular weight of more than 750, said hinered piperidine compound being selected from the group consisting of a compound having a repeating unit of

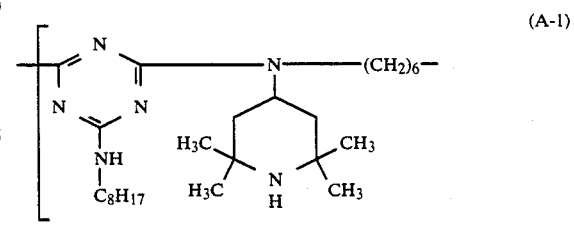
(A-1)

-continued

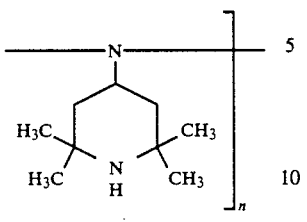

wherein n is an integer of 2 to 20, a compound having a repeating unit of

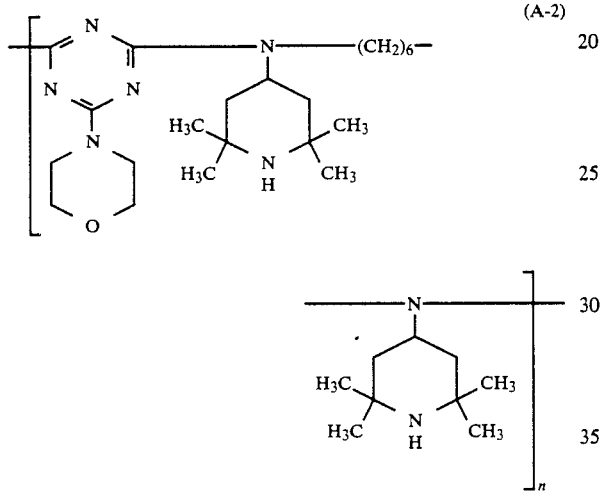

wherein n is an integer of 2 to 20, a compound having a repeating unit of

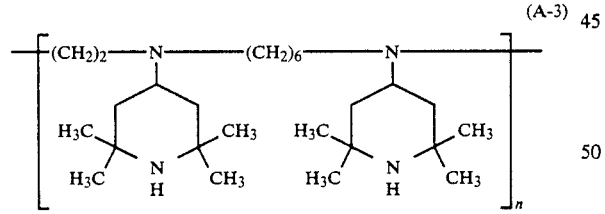

wherein n is an integer of 2 to 20, and a compound of

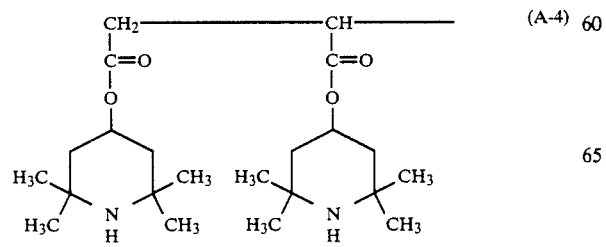

-continued

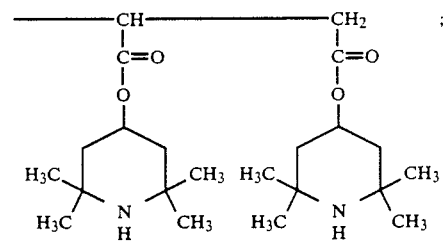

(B) 0.01 to 1 part by weight of a hindered piperidine compound having a molecular weight of less than 500, said hindered piperidine compound being selected from the group consisting of

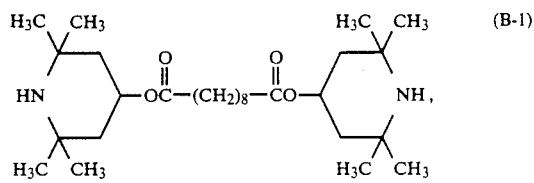

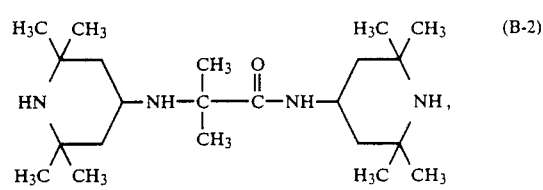

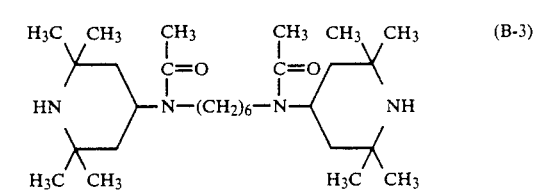

and

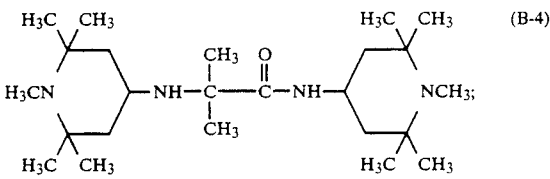

(C) 0.01 to 1 part by weight of a benzoate compound selected from the group consisting of

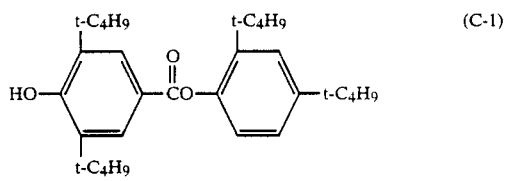

and

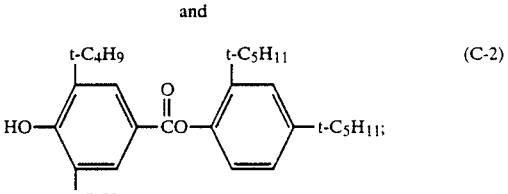

-continued
and (D) 0.01 to 1 part by weight of a phosphorus-containing compound selected from the group consisting of

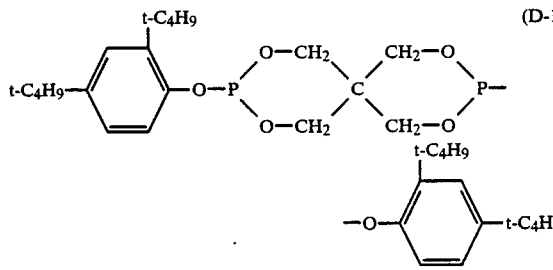
(D-1)

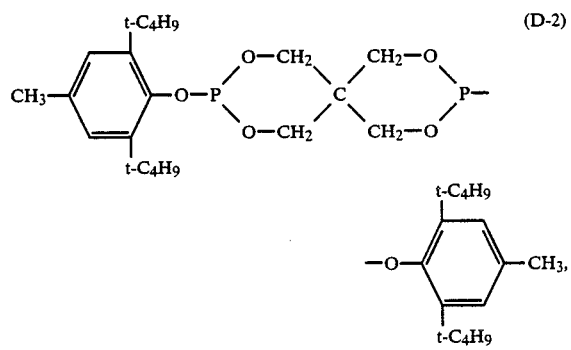
(D-2)

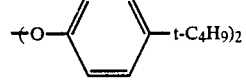
(D-3)

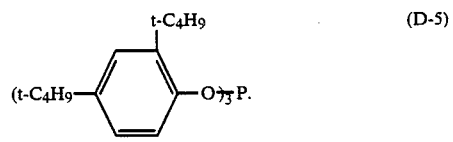
(D-4)

and

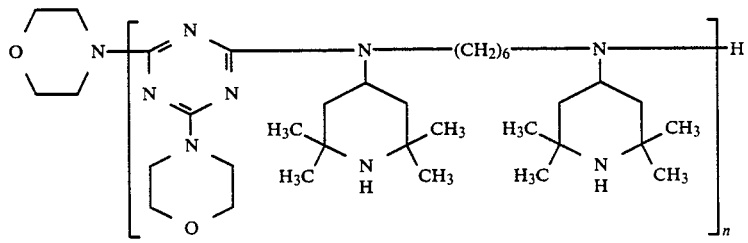
(D-5)

10. A polyolefin stabilized by the method of claim 9.

11. The polyolefin composition according to claim 2, wherein said hindered piperidine compound of the group (A) is (A-2).

12. The polyolefin composition according to claim 11, wherein said compound (A-2) is represented by the formula of wherein n is an integer of 2 to 20.

13. The method according to claim 9, wherein said hindered piperidine compound of the group (A) is (A-2).

14. The polyolefin stabilized by the method of claim 13.

* * * * *